(12) United States Patent
Yamaoka et al.

(10) Patent No.: US 10,070,588 B2
(45) Date of Patent: *Sep. 11, 2018

(54) GARDENING TOOL

(71) Applicant: Chervon (HK) Limited, Wanchai (HK)

(72) Inventors: Toshinari Yamaoka, Nanjing (CN); Fangjie Nie, Nanjing (CN); Haishen Xu, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/250,476

(22) Filed: Aug. 29, 2016

(65) Prior Publication Data

US 2017/0049049 A1 Feb. 23, 2017

Related U.S. Application Data

(63) Continuation of application No. 14/511,490, filed on Oct. 10, 2014, now Pat. No. 9,596,806.

(30) Foreign Application Priority Data

Oct. 10, 2013 (CN) .......................... 2013 1 0468919
Apr. 23, 2014 (CN) .......................... 2014 1 0167041

(51) Int. Cl.
*A01D 69/10* (2006.01)
*A01D 34/82* (2006.01)
*A01D 69/02* (2006.01)
*A01D 34/67* (2006.01)
*A01D 34/68* (2006.01)
*A01D 101/00* (2006.01)

(52) U.S. Cl.
CPC ............. *A01D 69/10* (2013.01); *A01D 34/67* (2013.01); *A01D 34/6806* (2013.01);
(Continued)

(58) Field of Classification Search
CPC .. A01D 43/0631; A01D 34/63; A01D 34/475; A01D 34/6806; A01D 35/6818;
(Continued)

(56) References Cited

U.S. PATENT DOCUMENTS 3,659,170 A * 4/1972 Burkett ................ H02K 7/1026
 310/77
3,750,378 A * 8/1973 Thorud .............. A01D 43/0631
 56/10.5
(Continued)

FOREIGN PATENT DOCUMENTS

CN 1299582 6/2001
CN 201146132 11/2008
(Continued)

OTHER PUBLICATIONS

U.S.P.T.O., Non-Final Office Action issued on U.S. Appl. No. 15/250,516, dated Oct. 13, 2017, 16 pgs.

*Primary Examiner* — Robert Eric Pezzuto
(74) *Attorney, Agent, or Firm* — Greenberg Traurig, LLP

(57) ABSTRACT

A gardening tool, such as a mower, includes a main body and a handle rotatably connected to the main body. The main body includes a motor. The handle includes a plurality of telescopic members slidably connected to each other. The mower further includes a operation assembly for being operated by a user to activate the motor and a control device for sending a control signal to enable or disable the operation of motor by the operation assembly.

21 Claims, 6 Drawing Sheets

(52) U.S. Cl.
CPC ......... *A01D 34/824* (2013.01); *A01D 34/828* (2013.01); *A01D 69/02* (2013.01); *A01D 2034/6843* (2013.01); *A01D 2101/00* (2013.01)

(58) Field of Classification Search
CPC .... A01D 34/828; A01D 34/78; A01D 34/824; A01D 2101/00; A01D 69/10; A01D 69/02; A01D 34/67; B60K 28/00; B60K 28/04; B62D 51/002
USPC .................. 56/10.1, 10.5, 10.8, 17.4, 320.2; 180/19.3, 272
See application file for complete search history.

(56) References Cited

U.S. PATENT DOCUMENTS

| | | | |
|---|---|---|---|
| 3,942,604 A * | 3/1976 | Black, III | B60K 28/00 180/19.3 |
| 4,043,102 A | 8/1977 | Uhlinger et al. | |
| 4,833,935 A * | 5/1989 | Roelle | A01D 34/6818 180/19.3 |
| 5,203,147 A * | 4/1993 | Long | A01D 34/6818 56/10.1 |
| 6,737,598 B1 | 5/2004 | Allen et al. | |
| 2009/0217636 A1 | 9/2009 | Loxterkamp et al. | |
| 2010/0162674 A1 | 7/2010 | Eaton et al. | |
| 2012/0317821 A1 | 12/2012 | Tsuchiya et al. | |
| 2014/0102063 A1 | 4/2014 | Yamaoka et al. | |
| 2014/0190141 A1 | 7/2014 | Edholm et al. | |
| 2014/0331809 A1 | 11/2014 | Mikula et al. | |

FOREIGN PATENT DOCUMENTS

| | | |
|---|---|---|
| CN | 101897261 | 12/2010 |
| CN | 201821663 | 5/2011 |
| CN | 102683052 | 9/2012 |
| CN | 102845186 | 1/2013 |
| CN | 202873363 | 4/2013 |
| EP | 0903074 A1 | 3/1999 |

* cited by examiner

GARDENING TOOL

RELATED APPLICATION INFORMATION

This application claims the benefit of and is a continuation of U.S. application Ser. No. 14/511,490, filed Oct. 10, 2014, and issued as U.S. Pat. No. 9,596,806, which application claims the benefit of CN 201310468919.9, filed on Oct. 10, 2013, and CN 201410167041.X, filed on Apr. 23, 2014, the disclosures of which are incorporated herein by reference in their entirety.

FIELD OF THE DISCLOSURE

The present disclosure relates generally to gardening tools, and more particularly to mowers.

BACKGROUND OF THE DISCLOSURE

A gardening tool such as a mower performs the tool function mainly in a way that a motor of a main body brings functional accessories (e.g., a blade) into operation. Generally speaking, such tools are characterized by higher power and movement of the functional accessories is characterized by high speed and high frequency, which therefore may bring certain hidden danger to an inattentive operator's safety. Currently danger is usually avoided by providing a longer handle to try and keep the operator far away from the main body. However, in order to conveniently receive the mower, the handle is received in a manner such as folding or rotating. In this way, it is possible that when the handle is in a received state and the user is too close to the main body, the user misoperates the switch and thereby starts the mower, whereupon the operator may place themselves into danger by getting too close to the main body.

The statements in this section merely provide background information related to the present disclosure and may not constitute prior art.

SUMMARY

In one aspect of the disclosure, a gardening tool includes: a main body at least having a functional accessory and a motor for driving the functional accessory; a handle rotatably connected to the main body and at least having one operation assembly for being operated by a user to control the motor when the handle is in a secure position; and a control system capable of preventing the motor from being controlled by the operation assembly and halting the motor meanwhile when the handle is out of the secure position.

Particularly, the gardening tool is a mower, wherein the motor is an electric motor and the functional accessory is a mowing blade.

The gardening tool, particularly a mower according to the present disclosure can control the motor and the functional accessory comprehensively according to the rotation position of the handle and the instant operation state of the handle. When the handle is in a state of abnormal use, even if the operation assembly on the handle for normally starting operation of the tool is misoperated, the motor and the functional accessory are not driven, and thereby ensure the user's safety and prevent occurrence of danger.

Further areas of applicability will become apparent from the description provided herein. It should be understood that the description and specific examples are intended for purposes of illustration only and are not intended to limit the scope of the present disclosure.

Figure 1:
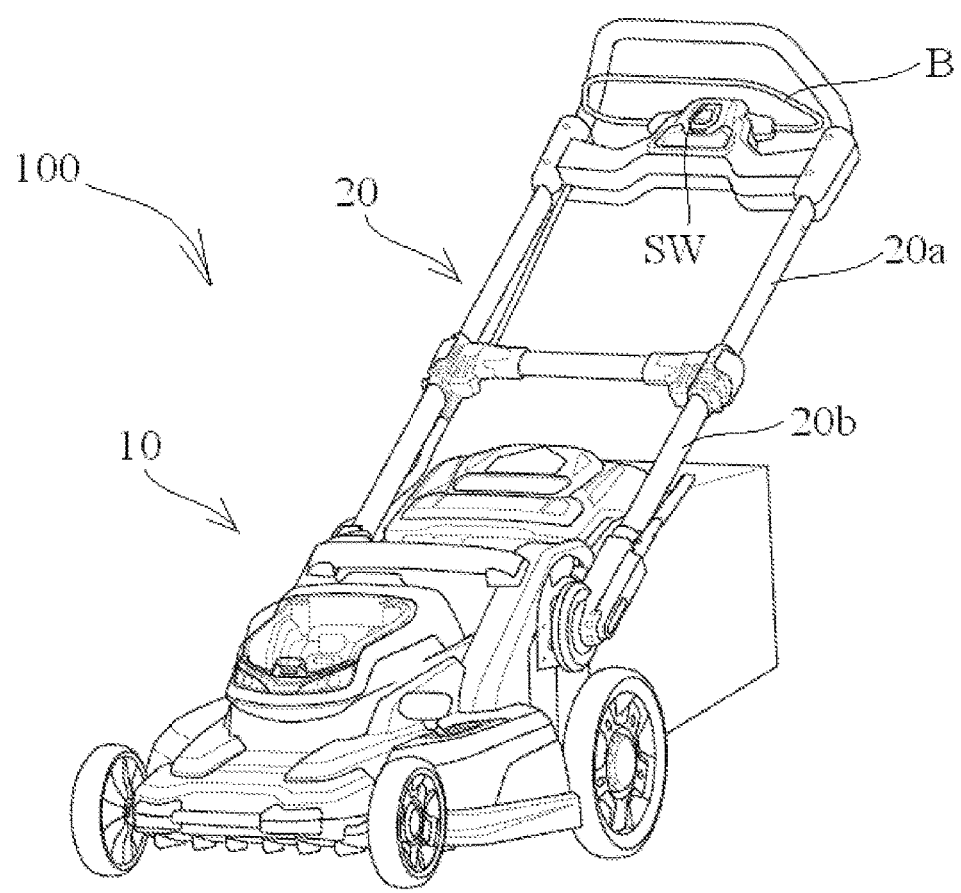
FIG. 1 is a schematic view of an exemplary gardening tool constructed according to the subject disclosure.

The drawings described herein are for illustrative purposes only of exemplary embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the invention, its application, or uses.

Referring to FIG. 1 through FIG. 10, as a preferred embodiment, a gardening tool according to the present invention is an electric mower 100.

The mower 100 comprises a main body 10, a handle 20 and a control system. The handle 20 is rotatably connected to the main body 10. The user may achieve accommodation by rotating the handle 20 to adjust an operation posture or reducing space occupied by the mower 100.

The main body 10 comprises a motor and a functional accessory. The functional accessory is used to perform the function of the tool. Regarding the mower 10, the functional accessory is a mowing blade. The motor functions to drive the functional accessory to move in a certain manner to achieve the tool function. Regarding the mower 100, the motor drives the functional accessory to rotate at a high speed. The following description is explained with the motor being an electric motor—which is not intended to be limiting.

To make the user have a comfortable and reliable operating experience, the handle 20 preferably comprises two handle bars. The ends of the handle bars close to the main body 10 are respectively connected to a rotation shaft 21 to achieve rotatable connection with the main body 10, and the ends away from the main body 10 are provided with an operation assembly therebetween. Regarding the mower 100, the operation assembly comprises a trigger B. By operating the trigger B, the user may achieve control of the mower 100 to start or stop the motor. Certainly, the operation assembly may also comprise other operating members such as a button.

The handle 20 at least comprises two telescopic tubes 20*a*, 20*b*. Specifically, one telescopic tube 20*b* forms a sleeve structure, and the other telescopic tube 20*a* is inserted into the telescopic tube 20*b* to form a slidable connection so that the telescopic tube 20*a* can achieve telescoping.

Figure 2:
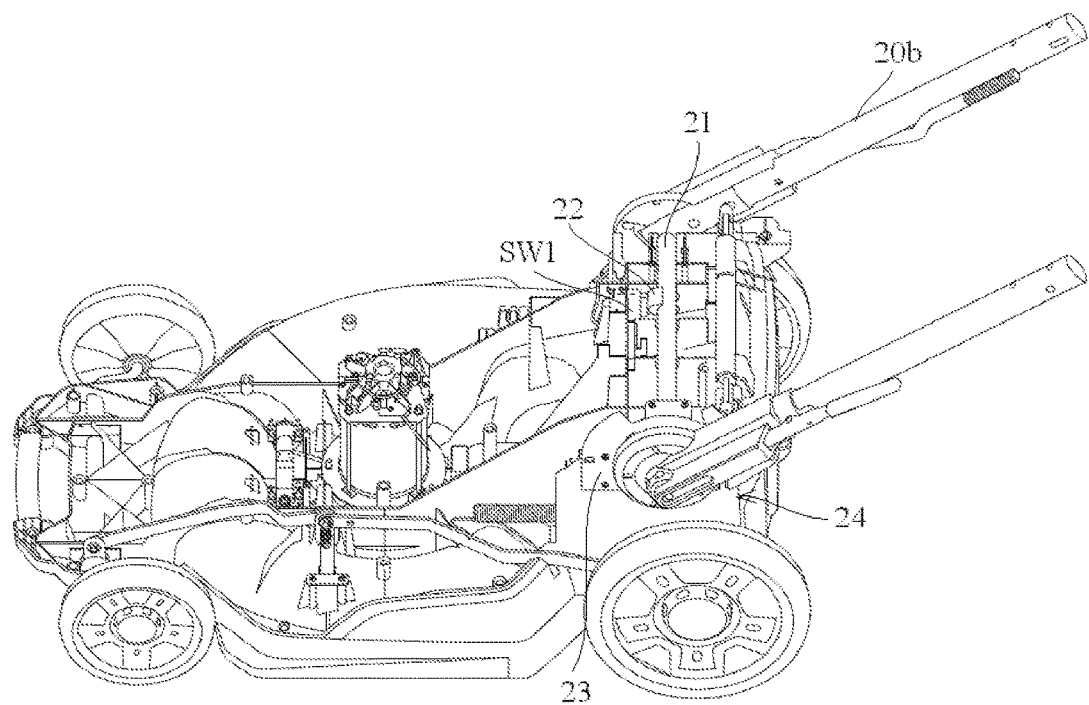
FIG. 2 is a partial schematic view of the tool of FIG. 1.
Figure 3:
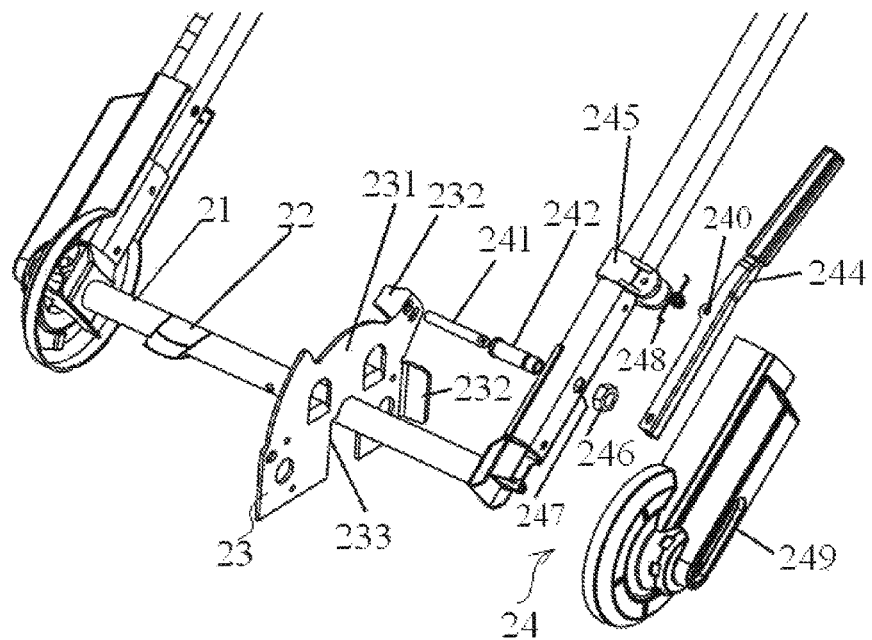
FIG. 3 is an exploded schematic view of a handle and its angle level mechanism of the tool of FIG. 1.
Figure 4:
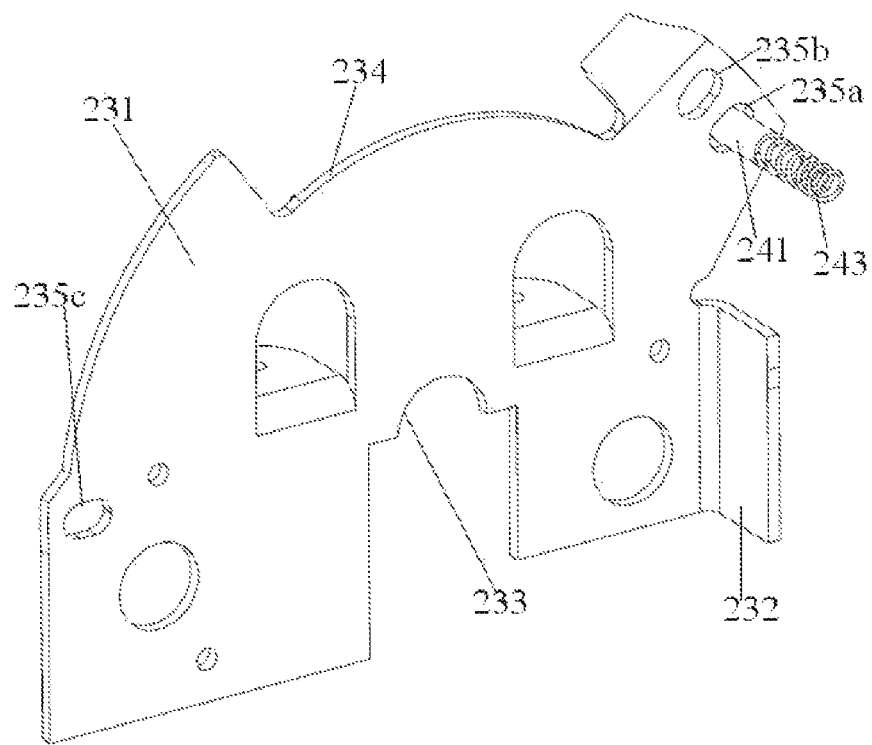
FIG. 4 is a schematic view of a level changing member of the tool of FIG. 1.
Figure 5:
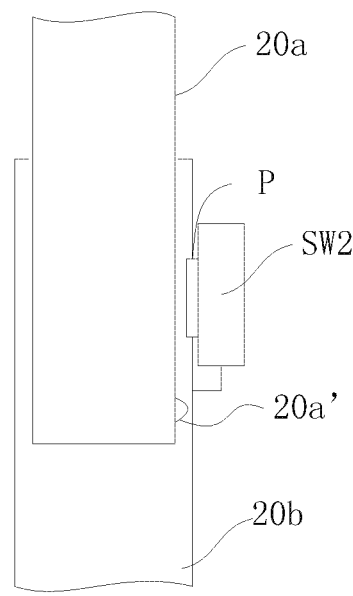
FIG. 5 is a schematic view illustrating that a telescopic tube does not extend to a designated position in the tool of FIG. 1.

In addition, in a preferred embodiment as shown in FIGS. 2, 3 and 5, in order to achieve adjustment of angle level when the handle 20 rotates, the angle level mechanism comprises a level changing member 23 and a locking mechanism 24 and is disposed at the rotation shaft 21 for connecting the handle 20 and the main body 10. The handle 20 is provided with the locking mechanism 24 which is automatically snap fitted with a plurality of levels of the level changing member 23 so as to fix and adjust the handle 20.

The level changing member 23 is used to set levels and cooperate with the locking mechanism to lock the levels. As a preferred embodiment, the level changing member 23 is a level change locking plate 231 which is in the shape of a plate structure. Certainly, the level changing member may take other forms such as a block shape. Besides, a mounting notch 233 is provided in a lower portion of the level change locking plate 231 so that the rotation shaft 21 will not be hindered upon rotating to change the level. Noticeably, the levels are a plurality of limiting holes 235*a*, 235*b*, 235*c* or an arcuate limiting notch 234 preferably formed on the level change locking plate 231, and the limiting holes 235*a*, 235*b*, 235*c* are located on the two sides of the limiting notch 234.

To better and flexibly adjust and fix the levels, the locking mechanism 24 comprises a level changing assembly for adjusting the levels and a control assembly for controlling the level changing assembly.

The level changing assembly comprises an automatic telescopic pin 241, a pin sleeve 242 and an elastic member 243, wherein the automatic telescopic pin 241 may cooperate with the limiting holes 235*a*, 235*b*, 235*c* and the limiting notch 234 to achieve level locking, the pin sleeve 242 is fixedly connected to an outer pipe 20*b* and sleeved around the outer periphery of the automatic telescopic pin 241 so as to constitute a slidable connection with the automatic telescopic pin 241, and the elastic member 243 may elastically eject the automatic telescopic pin 241 to the level of the level change locking plate 231 to achieve automatic locking of the level in the absence of an external force.

As a preferred solution, an end of the pin sleeve 242 fixedly connected to the outer pipe 20*b* is provided with external threads, and the outer pipe 20*b* is provided with a through hole 247 at the connection between the pin sleeve 242 and the outer pipe 20*b*. The through hole 247 is internally processed to form internal threads for mating with the external threads of the pin sleeve 242, so that the pin sleeve 242 is fixedly connected with the outer pipe 20*b*. Certainly, other methods may also be employed: for example, the portion of the pin sleeve 242 provided with external threads passes through the outer pipe 20*b* and then is fixedly connected with a nut 246 so as to fixedly connect the pin sleeve 242 and the outer pipe 20*b*.

To enable the automatic telescopic pin 241 to automatically cooperate with the levels better, a pin limiting structure is formed on the automatic telescopic pin 241, a sleeve limiting structure is formed on the pin sleeve 242, and the elastic member 243 is located between the pin limiting structure and the sleeve limiting structure. Preferably, the elastic member 243 is a spiral spring, the pin limiting structure is an annular step formed on an outer periphery of the automatic telescopic pin 241, and the sleeve limiting structure is an annular step formed in the pin sleeve 242. As such, one end of the spiral spring abuts against the pin limiting structure, and the other end abuts against the sleeve limiting structure so that the automatic telescopic pin 241 tends to move towards the level of the level changing member to achieve automatic level locking.

Upon level change operation, the automatic telescopic pin 241 needs to retreat out of a level and move, whereby the control assembly is needed to bring the automatic telescopic pin 241 to move.

The control assembly comprises an operation member 244 and a fixing member 245, wherein the operation member 244 is an executing member used by the operator to achieve level adjustment, and the operation member 244 is provided with an anti-skid structure at an end thereof to be manually held so that that the operator may control the operation member 244 more reliably. The automatic telescopic pin 241 passes through the pin sleeve 242 and the outer pipe 20*b* and is rotatably connected to the other end of the operation member 244. Preferably, a shaft hole is formed at the connection between the automatic telescopic pin 241 and the operation member 244, and a shaft is inserted into the shaft hole to rotatably connect the automatic telescopic pin 241 and the operation member 244.

The fixing member 7 is fixedly connected to the outer pipe 20*b* provided with the through hole 247, and the operation member 244 is rotatably connected to the fixing member 245. To allow for rotatable connection between the operation member 244 and the fixing member 245, as a preferred solution, a connection shaft hole 240 is formed on both the fixing member 245 and the operation member 244, and upon installation, a rotation shaft is inserted into the connection shaft hole 240 to form the rotatable connection. The resultant rotatable connection is not only firm and reliable, but also simple in structure and easy to install. As such, the operation member 244 is formed as a lever with a location for connection with the fixing member 245 as a pivot point. When an external force drives the anti-skid handle of the operation member to approach the outer pipe 20, the automatic telescopic pin 241, due to the action of the operation member 244, is forced to move away from the level changing member and retract out of the level to get ready for level adjustment.

To further improve convenience in use, the operation assembly further comprises a return member 248 enabling the operation member 244 to return automatically in the absence of an external force. Preferably, the return member 248 may be a torsion spring sleeved around the outer periphery of the rotation shaft. One end of the torsion spring abuts against the operation member 244, and the other end thereof abuts against the fixing member 7 or the outer pipe 20*b* fixedly connected to the fixing member 245. Therefore, in the absence of the external force, elastic energy of the torsion spring drives the operation member 244 to achieve automatic return. Certainly, the return member 248 here may also be designed based on magnetic energy, which is a readily-envisaged variation and not detailed herein.

The above depictions have introduced a multi-level operation handle mechanism capable of achieving automatic level change conveniently and reliably. A protective cover 249 is mounted outside the outer pipe 20*b* mounted with the pin sleeve 242 to protect the multi-level operation handle mechanism and the mower and provide a more pleasant and compact appearance.

To make the level change locking plate 231 more firmly fixed to a main body of the mower, the level change locking plate 231 bends and extends in a direction parallel to the rotation shaft 21 to form a stopping structure 232. The main body of the mower is provided with a mounting structure for cooperating with the stopping structure 232. The mounting structure may be, but need not be limited to, a groove integrally formed with the main body of the mower and configured to accommodate the stopping structure 232. As such, the level change locking plate 231 is fixed on the main body of the mower via screws. Furthermore, the cooperation of the stopping structure 232 and the mounting structure can effectively prevent displacement and ensure very reliable installation and limiting of the stopping structure 232 and the mounting structure.

As a preferred embodiment, the levels comprise limiting holes 235a, 235b, 235c and a limiting notch 234, wherein there are three limiting holes with two of them being adjacent to each other and located on the same side of the limiting notch 14. A first height level 235a and a second height level 235b are used to adjust the height of the operation handle upon normal use of the mower to meet the needs of different user groups with different heights, and the remaining limiting hole 235c is arranged on the other side of the limiting notch 234 and used as an accommodating level for folding the handle upon accommodating the mower. The limiting notch 234 is a movable level having an arc-shaped end and allowing the automatic telescopic pin 241 to move upon grass dumping operation.

The control system is used to ensure security when the user is using the mower 100, and it at least can lock the motor so that the motor is not controlled by the operation assembly when the handle 20 does not rotate to a designated position, thus the motor remains in a stop state and not started.

The advantage of this configuration is that when the handle 20 does not rotate to the designated position (generally a working position of the handle 20, the position of the handle 20 in FIG. 1), it can be ensured that even though the user misoperates the operation assembly, e.g., inadvertently pulls the trigger B, the motor is locked and cannot be started, thereby preventing accidental movement from causing injury to the user's body. That is because when the handle 20 does not rotate to the designated position, the user has not gotten ready for mowing and he might be in a dangerous position and vulnerable to injury.

In consideration of the above and in order to consider all possible risks upon use of the mower to provide security and protection to the user, the control system comprise at least two control devices, wherein one control device can control the motor only when the remaining control devices all are in a designated state.

As such, only when the control devices responsible for monitoring risk items all are in a designated state corresponding to absence of danger can the control device in the control system initiatively controlled by the user be unlocked to achieve its function. If one control device responsible for monitoring risk items is in a state corresponding to presence of danger, it locks the control device in the control system initiatively controlled by the user so that the user cannot start the motor, and stops the running motor and functional accessory in case that the motor is running.

Preferably, the control system comprises a first control device controlled by the user via the operation assembly. The first control device can be operated by the user to start the motor only when the remaining control devices in the control system all are in the designated state. The first control device is a user end control device that can be locked by any other control devices responsible for monitoring risk items in the control system.

The first control device may comprise a first switch or a first signal source device, or a combination thereof.

Generally, to achieve control of the user end, only one first switch or one first signal source device is needed. However, for the sake of security, to make sure that the user's operation is indeed intended to start the mower 100 and ensure safety, the first control device comprises a plurality of first switches and a plurality of first signal source devices, preferably two first switches, wherein one first switch is a contact switch that can be triggered by the trigger B and connected in series in a power supply circuit of the motor, and the motor is not powered when it is switched off, and it switches on the circuit when it is triggered by the trigger B. The other first switch is a position switch which is also connected in series in the power supply circuit of the motor, and it switches on the circuit when it detects that the trigger B moves to a corresponding position. As such, security guarantee may be increased by determining double control.

Certainly, one first signal source device may be set. This first signal source device may be a photoelectric switch which participates in control by sending a control signal to the switch in the power supply circuit. The photoelectric switch may be used to detect the user's operation action or detect whether there is an obstacle in an advancement direction of the mower 100.

Preferably, the first switch is one of a contact switch, a proximity switch, a Hall switch and a photoelectric switch, and the first signal source device is one of a contact switch, a proximity switch, a Hall switch and a photoelectric switch.

Referring to FIG. 1, as the simplest solution, the first control device only comprises one first switch which is connected in series in the power supply circuit. The first switch is a contact switch SW that can be controlled by the trigger B.

The risk items monitored by the control device may comprise: an angle of the handle relative to the main body, telescopic situations of the telescopic tubes, electric power source temperature, motor temperature and blocked rotation.

When the angle of the handle relative to the main body is taken as the risk item to be monitored, the control system comprises a second control device that can be controlled by the handle according to its rotation. When the handle rotates to a designated position relative to the main body, the second control device unlocks the first control device so that the first control device can start the motor, and when the handle rotates to a position other than the designated position relative to the main body, the second control device locks the first control device so that the first control device cannot start the motor.

The second control device comprises a second switch or a second signal source device, or a combination thereof. The second switch is connected in the power supply circuit, and the second signal source device can send a control signal to the power supply circuit.

The second switch is one of a contact switch, a proximity switch, a Hall switch and a photoelectric switch; and the second signal source device is one of a contact switch, a proximity switch, a Hall switch and a photoelectric switch.

Figure 7:
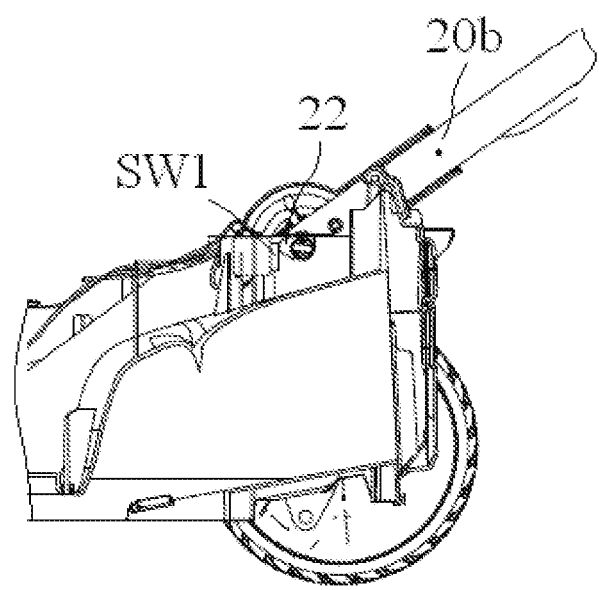
FIG. 7 is a schematic view illustrating that a handle rotates to a designated position in the tool of FIG. 1.
Figure 8:
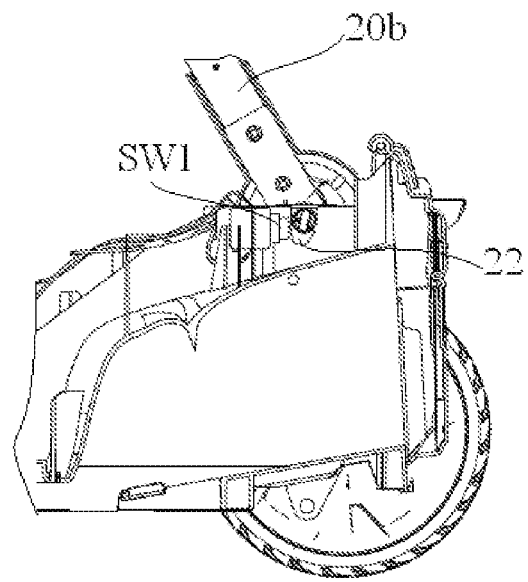
FIG. 8 is a schematic view illustrating that a handle does not rotate to a designated position in the tool of FIG. 1.

Referring to FIG. 2, FIG. 7 and FIG. 8, as a preferred solution, the second control device only comprises a second switch disposed at the rotation shaft of the handle. The second switch is a contact switch SW1 secured to the main body 10. A contact is provided on one side of the second switch towards the rotation shaft 21. A trigger member 22 is provided at a location in the axial direction of the rotation shaft 21 corresponding to the contact switch SW1. When the handle 20 brings the rotation shaft 21 to rotate, the trigger member 22 triggers the contact of the contact switch SW1 when it rotates to a designated angle (generally, when the handle 20 rotates to a designated secure position).

Figure 9:
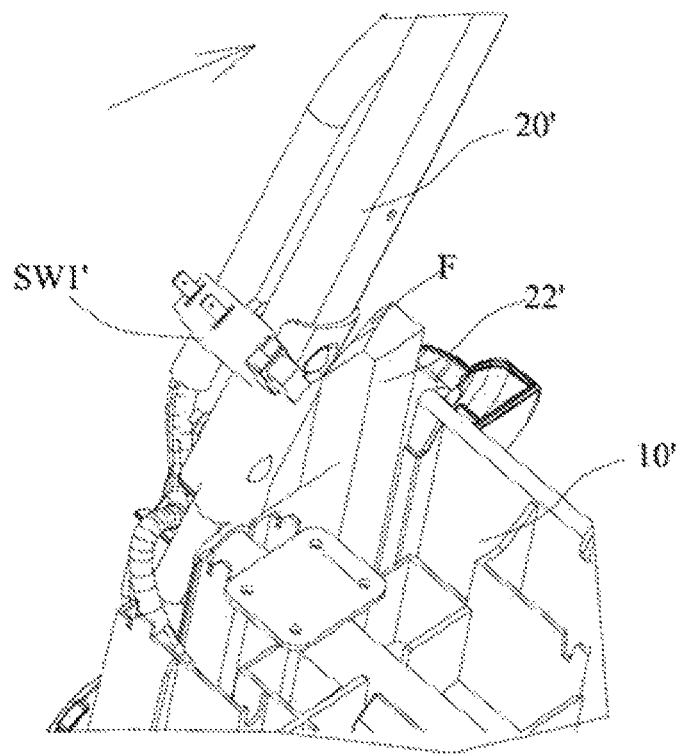
FIG. 9 is a schematic view of a control device also constructed according to the subject disclosure.
Figure 10:
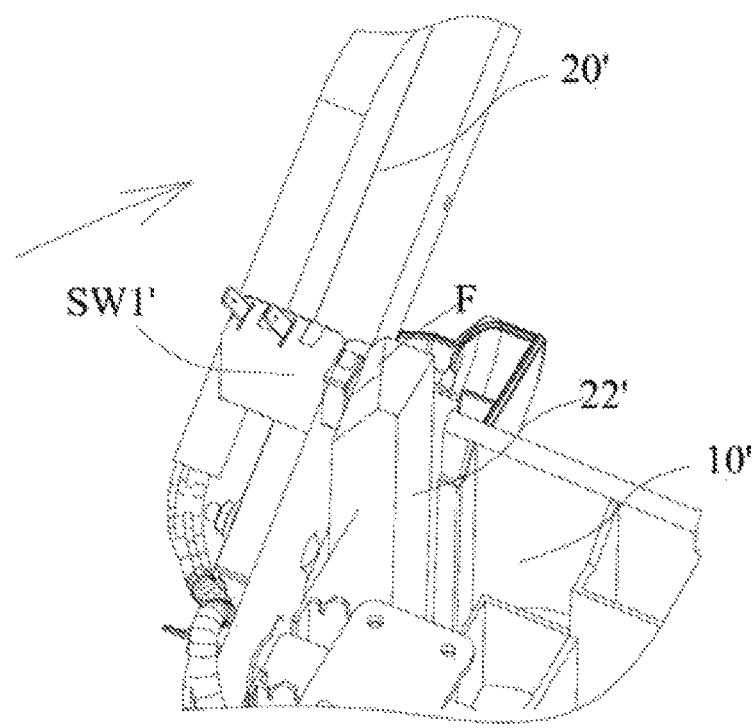
FIG. 10 is a schematic view of the portion shown in FIG. 9 when the handle rotates to a designated position.

As shown in FIG. 9 and FIG. 10, as another preferred solution, the second control device only comprises a second switch disposed at the rotation shaft of the handle. The second switch is a contact switch SW1'. The contact switch SW1' is mounted on the handle 20' and rotates along with it. A contact of the contact switch SW1' faces towards a main body 10'. The main body 10' is provided with a fixed trigger member 22'. A slant surface F is formed on one side of the trigger member 22' opposite to the handle 20'. When the handle 20' rotates, the contact switch SW1' rotates along with it. When the handle 20' rotates to a certain angle, the slant surface F gradually presses the contact of the contact switch SW1' along with the rotation, and when the handle 20' rotates to a designated angle, the slant surface F completely triggers the contact switch SW1'.

When the telescopic situation of the telescopic tube is taken as the risk item to be monitored, the control system further comprises a third control device. The third control device can be controlled by a telescopic action of one telescopic tube 20a. When the telescopic tube extends to a designated position relative to the other telescopic tube, the third control device unlocks the first control device so that the first control device can start the motor, and when the telescopic tube extends to a position other than the designated position, the third control device locks the first control device so that the first control device cannot start the motor.

The third control device comprises a third switch or a third signal source device, wherein the third switch is connected in the power supply circuit, and the third signal source device can send a control signal to the power supply circuit.

Preferably, the third switch is one of a contact switch, a proximity switch, a Hall switch and a photoelectric switch; and the third signal source device is one of a contact switch, a proximity switch, a Hall switch and a photoelectric switch.

Figure 6:
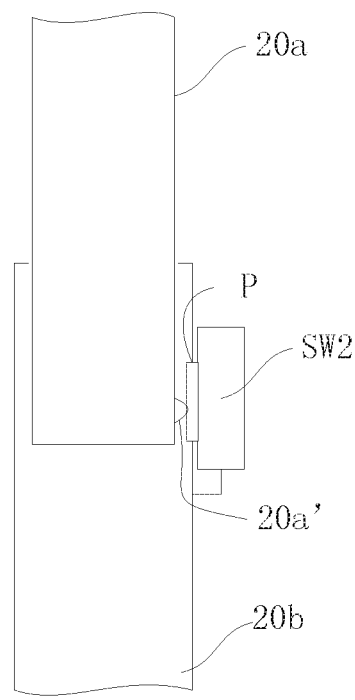
FIG. 6 is a schematic view illustrating that the telescopic tube extends to a designated position in the tool of FIG. 1.

As shown in FIG. 5 and FIG. 6, as a preferred solution, the third control device only comprises a second switch disposed at an end of the telescopic tube 20b. The second switch is a contact switch SW2. The telescopic tube 20b is a sleeve structure. A contact P of the contact switch SW2 penetrates a pipe wall of the telescopic tube 20b and extends into the sleeve structure. The telescopic tube 20a is inserted into the telescopic tube 20b, and a trigger member 20a' is disposed at a bottom end of the telescopic tube 20a. When the telescopic tube 20a is drawn out of the telescopic tube 20b (i.e., when the handle 20 is in an extended state), the trigger member 20a' triggers the contact P of the contact switch SW2 via contact.

Preferably, the contact switch SW, the contact switch SW1 and the contact switch SW2 all are connected in series on the same line of the power supply circuit. When one of the contact switch SW1 and the contact switch SW2 switches off, no matter whether the contact switch SW is triggered by the trigger B to be in an off or on state, the power supply circuit cannot communicate with the line to allow the electric power source to provide electrical energy to the motor, thereby achieving safety protection.

As a preferred solution, in order to prevent the functional accessory from moving due to inertia and thereby causing injury to the user after the motor turns off, the mower 100 further comprises a brake system configured to brake the mowing blade by physical contact. The brake system can brake the functional accessory at least when the control system controls the motor to stop.

Specifically, any one of the control devices controls the motor to turn off, and then the control system controls the brake system to stop the mowing blade from continuing to move due to the inertia, thereby achieving urgent braking. Such braking may be achieved by contacting the mowing blade or by contacting a transmission member fixedly connected thereto.

In the brake system, electrical control of entity devices may be achieved by attraction and release of an electromagnet.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A mower, comprising:
    a main body including a motor for driving a mowing blade to rotate;
    an operation assembly for being operated by a user to activate the motor;
    a handle rotatably connected to the main body and including a plurality of telescopic members slidably connected to each other; and
    a control device for sending a control signal to cause the motor to be activated by the operation assembly when one of the plurality of telescopic members is caused to be moved to a predetermined position relative to another one of the plurality of telescopic members or to prevent the motor from being activate by the operation assembly when the one of the plurality of telescopic members is caused to be moved away from the predetermined position relative to the another one of the plurality of telescopic members.

2. The mower as recited in claim 1, further comprising an electric power source and a power supply circuit for enabling the electric power source to provide power to the motor wherein the control device comprises a switch connected in the power supply circuit to connect the electric power source to the motor or disconnect the electric power source to the motor.

3. The mower as recited in claim 2, wherein the switch is mounted to one of the plurality of telescopic members and rotates with the handle synchronously.

4. The mower as recited in claim 2, wherein the switch is mounted to the main body and the handle rotates relatively to the switch.

5. The mower as recited in claim 1, further comprising an electric power source and a power supply circuit for enabling the electric power source to provide power to the motor wherein the control device comprises a signal source for sending the control signal to the power supply circuit to disconnect the electric power source to the motor.

6. The mower as recited in claim 5, wherein the signal source is mounted to one of the plurality of telescopic members and rotates with the handle synchronously.

7. The mower as recited in claim 5, wherein the signal source is mounted to the main body and the handle rotates relatively to the signal source.

8. The mower as recited in claim 1, further comprising an electric power source; and a power supply circuit for enabling the electric power source to provide power to the motor wherein the control device comprises a switch and the signal source, the switch is configured to be triggered by the operation assembly to activate the motor, and the signal source sends the control signal to the power supply circuit to disable the activation of the motor when the one of the plurality of telescopic members is caused to be move away from the predetermined position relative to the another one of the plurality of telescopic members.

9. The mower as recited in claim 1, further comprising an electric power source and a power supply circuit for enabling the electric power source to provide power to the motor wherein the control device comprises a plurality of switches connected in the power supply circuit to control the connection between the electric power source and the motor and one of the plurality of switches turns on when being triggered by the operation assembly and another one of the plurality of switches turns off when the one of the plurality of telescopic members is caused to be move away from the predetermined position relative to the another one of the plurality of telescopic members.

10. The mower as recited in claim 1, further comprising an electric power source and
a power supply circuit for enabling the electric power source to provide power to the motor wherein the control device comprises a signal source for sending signals to the power supply circuit to control the connection between the electric power source and the motor, wherein the signal source enables the operation of the operation assembly to the motor when one of the plurality of telescopic members is caused to move to the predetermined position relative to another one of the plurality of telescopic members and the signal source disables the operation of the operation assembly to the motor when the one of the plurality of telescopic members is caused to be move away from the predetermined position relative to the another one of the plurality of telescopic members.

11. A gardening tool, comprising:
a main body at least having a functional accessory and a motor for driving the functional accessory;
a handle connected to the main body and at least having one operation assembly for being operated by a user to control the motor when the handle is located in a predetermined position relative to the main body, the handle being rotatable relative to the main body around a pivot axis;
an electric power source and a power supply circuit enabling the electric power source to provide power to the motor; and
a control system for preventing the motor from being controlled by the operation assembly and halting the motor when the handle is located out of the predetermined position, the control system comprising:
a first control device configured to be controlled by the operation assembly and a second control device disposed at a position proximate to the pivot axis and configured to be controlled according to the rotating position of the handle wherein, when the handle rotates to the predetermined position relative to the main body, the control system allows starting of the motor and, when the handle rotates to a position other than the predetermined position relative to the main body, the control system is not allowed to start the motor and wherein the second control device comprises a signal source device for sending a control signal to the power supply circuit.

12. The gardening tool according to claim 11, wherein the handle comprises a plurality of telescopic tubes and the control system further comprises a third control device configured to be controlled by the telescopic action of the telescopic tubes, wherein, when a first one of the plurality of telescopic tubes is in a designated position relative to a second one of the plurality of telescopic tubes, the third control device unlocks the first control device so that the first control device allows starting of the motor and, when the first one of the plurality of telescopic tubes is not in the designated position relative to the second one of the plurality of telescopic tubes, the third control device locks the first control device so that the first control device is not allowed to start the motor, and wherein the third control device comprises a switch connected to the power supply circuit.

13. The gardening tool according to claim 12, wherein the switch is one of a contact switch, a proximity switch, a Hall switch, and a photoelectric switch, and the third signal source device is one of a contact switch, a proximity switch, a Hall switch, and a photoelectric switch.

14. The gardening tool according to claim 11, wherein the gardening tool further comprises a brake system capable of braking the functional accessory at least when the control system is stopping the motor.

15. A mower, comprising:
a main body at least having a mowing blade and a motor for driving the mowing blade;
a handle having an end rotatably connected to the main body and at least having one operation assembly for being operated by a user to control the motor when the handle is located in a predetermined position relative to the main body;
an electric power source and a power supply circuit enabling the electric power source to provide power to the motor; and
a control system for preventing the motor from being controlled by the operation assembly and halting the motor when the handle is located out of the predetermined position, the control system comprising:
a first control device configured to be controlled by the operation assembly and a second control device disposed at a position proximate to the end of the handle and configured to be controlled according to a rotating position of the handle wherein, when the handle rotates to the predetermined position relative to the main body, the second control device unlocks the first control device so that the first control device allows starting of the motor and, when the handle rotates to a position other than the predetermined position relative to the main body, the second control device locks the first control device so that the first control device is not allowed to start the motor, and wherein the second control device comprises at least one of a first switch connected to the power supply circuit and a first signal source device for sending a control signal to the power supply circuit.

16. The mower according to claim 15, wherein the handle comprises a plurality of telescopic tubes, and the control system further comprises a third control device configured to be controlled by the telescopic action of the telescopic tubes, wherein when a first one of the plurality of telescopic tubes is in a designated position relative to a second one of the plurality of telescopic tubes, the third control device unlocks the first control device so that the first control device allows starting of the motor and, when the first one of the plurality of telescopic tubes is not in the designated position relative to the second one of the plurality of telescopic tubes, the third control device locks the first control device so that the first control device is not allowed to start the motor, and wherein the third control device comprises at least one of a second switch connected to the power supply circuit and a second signal source device for sending a control signal to the power supply circuit.

17. The mower according to claim 16, wherein the first switch is one of a contact switch, a proximity switch, a Hall switch, and a photoelectric switch, the first signal source device is one of a contact switch, a proximity switch, a Hall switch, and a photoelectric switch, the second switch is one of a contact switch, a proximity switch, a Hall switch, and a photoelectric switch, and the second signal source device is one of a contact switch, a proximity switch, a Hall switch, and a photoelectric switch.

18. The mower according to claim 15, wherein the mower further comprises a brake system capable of braking the mowing blade at least when the control system is stopping the motor.

19. The mower according to claim 15, wherein the operation assembly comprises a trigger, and the first control device is a contact switch contacted and triggered by the trigger.

20. The mower according to claim 15, wherein the first switch is a contact switch.

21. The mower according to claim 16, wherein the third control device is a contact switch disposed at an end of the first one of the plurality of telescopic tubes.

* * * * *

(12) INTER PARTES REVIEW CERTIFICATE (3340th)

United States Patent
Yamaoka et al.

(10) Number: US 10,070,588 K1
(45) Certificate Issued: Dec. 1, 2023

(54) GARDENING TOOL

(71) Applicants: Toshinari Yamaoka; Fangjie Nie; Haishen Xu

(72) Inventors: Toshinari Yamaoka; Fangjie Nie; Haishen Xu

(73) Assignee: CHERVON INTELLECTUAL PROPERTY LIMITED

Trial Number:

IPR2020-00888 filed May 1, 2020

Inter Partes Review Certificate for:

Patent No.: 10,070,588
Issued: Sep. 11, 2018
Appl. No.: 15/250,476
Filed: Aug. 29, 2016

The results of IPR2020-00888 are reflected in this inter partes review certificate under 35 U.S.C. 318(b).

INTER PARTES REVIEW CERTIFICATE
U.S. Patent 10,070,588 K1
Trial No. IPR2020-00888
Certificate Issued Dec. 1, 2023

AS A RESULT OF THE INTER PARTES REVIEW PROCEEDING, IT HAS BEEN DETERMINED THAT:

Claims 1-12, 15-17 and 19-21 are found patentable.

\* \* \* \* \*